(No Model.)
T. J. PIERCE.
INSULATED PIPE JOINT OR COUPLING.
No. 495,513. Patented Apr. 18, 1893.
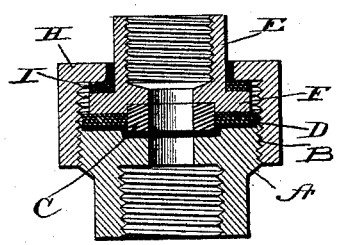
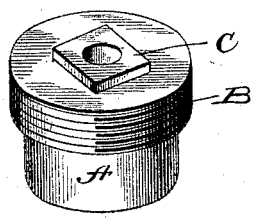 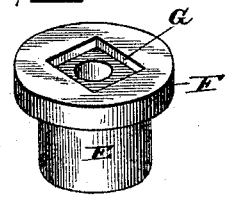

UNITED STATES PATENT OFFICE.

THOMAS J. PIERCE, OF PHILADELPHIA, PENNSYLVANIA.

INSULATED PIPE JOINT OR COUPLING.

SPECIFICATION forming part of Letters Patent No. 495,513, dated April 18, 1893.

Application filed August 19, 1892. Serial No. 443,494. (No model.)

*To all whom it may concern:*

Be it known that I, THOMAS J. PIERCE, a citizen of the United States, residing at Philadelphia, in the county of Philadelphia and State of Pennsylvania, have made a new and useful invention in Insulating Pipe Joints or Couplings for Use in Connection with Gas-Fixtures or in Analogous Places, of which the following is a specification.

My invention relates particularly to improvements in pipe joints or couplings used in connection with gas fixtures wherein electric wires are conducted through the fixtures for various purposes, and its objects are, first, to devise such an insulated joint or coupling as will afford absolute insulation between the suspended portion of a gas fixture and the system of gas pipes to which it is connected: second, to so arrange the parts as to simplify their relation and conceal them from view: third, to make such apparatus detachable and readily accessible at all times for repairs or examination of the parts united.

My invention will be fully understood by referring to the accompanying drawings in which, Figure 1 is a vertical sectional view taken through the body of my improved coupling. Fig. 2 is a perspective view of the lower or suspending portion to which the gas fixture is to be attached. Fig. 3 is a perspective view of the upper or suspended portion which is attached directly to the gas pipe connected with a system of pipes usually having an earth connection somewhere in the building.

Prior to my invention it was old in the art to insulate gas fixtures from the pipes which conducted the gas to the fixtures by inserting an insulating medium between the fixture, the coupling, and the pipe to which it was attached, and to hold the parts together by a screw collar.

My invention is directed to a safer and more secure structure which permits of an absolute insulation between the aforesaid parts and at the same time affords easy access to all of the parts either for the insertion of new insulation or for the purpose of detecting any possible leak which might occur through the imperfection of the insulation.

Referring now to the drawings in detail: E represents that portion of the joint or coupling which is usually attached to a gas pipe near the ceiling being internally screw threaded at its upper end and provided with an extension or rim F at its lower end and a rectangular or equivalent shaped recess or depression G in its lower face.

A represents the suspending portion of the joint to which the fixture is usually attached, it being internally screw threaded at its lower end and externally screw threaded at its upper end and provided with a depression similar in all respects to the depression G of the upper or suspending portion E.

C represents a hollow insulating block of the same configuration as the depressions G in the parts E and A, said block being preferably secured to the lower part A by an insulating cement although it may be of metal and separated therefrom by insulating washers of mica or equivalent material, I and D being additional insulating washers which separate or insulate the suspending portion E from the part A and the surrounding or uniting or binding collar H screw threaded on its inner side and having an opening in its upper side of slightly greater diameter than the upper portion E of the coupling, the arrangement being such that when the mica or equivalent washers I and D are in position, and the block C resting in the depressions of the opposing parts E and A, the several parts may be securely bound together by the locking collar H. With this arrangement of parts and through the agency of the locking collar H I am enabled to securely insulate the suspended portion of a fixture from the main gas pipes as will be clearly appreciable on examination of Fig. 1 of the drawings. When the parts are put together as indicated in that figure and the insulating washers in position, the structure is securely insulated and all of the parts of the insulation are wholly concealed from view, features of utility not heretofore found in structures of this general character.

I do not limit myself to the specific details of construction herein shown and described as I believe it is broadly new with me to unite the parts of an insulating joint for a gas fixture or for analogous uses where insulating joints are utilized by a locking collar and an intermediate locking block, and my claims are generic in this particular.

Having thus described my invention, what I claim, and desire to secure by Letters Patent of the United States, is—

1. An insulating joint or coupling consisting of two separable parts each having a depression, which depressions firmly hold or secure an insulating block surrounded by additional insulating material, in combination with a collar uniting said parts together and insulated from the upper part substantially as described.

2. An insulating joint or coupling consisting of two similar parts frictionally united together by an intermediate insulating block C resting in depressions in the parts; insulating material resting on an enlarged extension of one of the parts and a locking collar screw threaded on to the other part and resting upon said insulating material substantially as described.

3. An insulating joint or coupling consisting of two separable parts E and A provided with angular depressions sustaining an intermediate insulating block C, insulating material I resting upon an enlarged extension of the part E, in combination with a locking collar H which rests upon the insulating material I and is screw threaded on to the part A substantially as described.

In testimony whereof I affix my signature in the presence of two witnesses.

THOMAS J. PIERCE.

Witnesses:
MICHAEL F. McCULLEN,
F. EARLE VON LEER.